April 2, 1957  R. G. PIETY  2,787,757
METHOD AND APPARATUS FOR LOGGING WELLS
Filed Dec. 22, 1952  3 Sheets-Sheet 1

INVENTOR.
R. G. Piety
BY Hudson & Young
ATTORNEYS

April 2, 1957 R. G. PIETY 2,787,757
METHOD AND APPARATUS FOR LOGGING WELLS
Filed Dec. 22, 1952 3 Sheets-Sheet 2

INVENTOR.
R. G. Piety
BY Hudson & Young
ATTORNEYS

April 2, 1957  R. G. PIETY  2,787,757
METHOD AND APPARATUS FOR LOGGING WELLS
Filed Dec. 22, 1952  3 Sheets-Sheet 3

INVENTOR.
R. G. Piety
BY Hudson & Young
ATTORNEYS

United States Patent Office 2,787,757
Patented Apr. 2, 1957

2,787,757

METHOD AND APPARATUS FOR LOGGING WELLS

Raymond G. Piety, Bartlesville, Okla., assignor to Phillips Petroleum Company, a corporation of Delaware Application December 22, 1952, Serial No. 327,284

19 Claims. (Cl. 324—1)

This invention relates to improved methods of and apparatus for making electrical resistivity measurements in bore holes.

In drilling for oil it is highly desirable to obtain information regarding the geological strata penetrated by a bore hole. One particular method of obtaining this information is by electrical logging wherein one or more electrodes are lowered into the bore hole to determine certain physical properties associated with the earth formations adjacent thereto. One of the most important properties which can be measured by these procedures is the electrical resistivity of the surrounding formations which varies widely at different depths.

One method of making such resistivity measurements comprises lowering a first electrode into the bore hole and applying a potential difference between this suspended electrode and a second electrode which is grounded at a region remote from the first electrode. The current flow between the two electrodes is observed as the first electrode is moved through the bore hole, and from this current flow the resistance of the surrounding formations can be calculated. It is, of course, understood that the electrode disposed in the bore hole is submerged in drilling fluid or natural well fluids which offer additional resistance to the passage of current between the suspended electrode and the second grounded electrode. The presence of these fluids can introduce considerable error, especially if the resistivity of the fluids is relatively large in comparison with the resistivity of the surrounding earth formations.

A second procedure that has been employed to determine the resistivity of earth formations surrounding a bore hole comprises lowering a first current electrode into a selected region of the bore hole and applying a potential difference between the suspended electrode and a point of ground potential. A pair of spaced pick-up electrodes also are suspended in the bore hole in spaced relation with the generating electrode and the potential difference therebetween is observed. This measuring system is based upon the principle that the current flow from such an isolated current electrode extends radially outward if the well fluids and the adjacent earth formations are homogeneous. By measuring the potential difference between the two pick-up electrodes a resistance can be calculated which is assumed to represent the corresponding resistance between two regions in the earth formation spaced the same distance from the generating electrode. However, because the well fluids often have resistivities which vary considerably from the resistivity of the surrounding earth formations this method does not provide an entirely accurate indication of the earth formation resistivity.

In order to obtain an accurate measurement of the resistivity of selected earth formation it is necessary to establish a current flow therethrough in substantially a horizontal direction. This is accomplished in accordance with the present invention by suspending an elongated cylindrical casing into the bore hole and applying a potential difference between this casing and a reference electrode which is grounded at a region remote from the suspended casing. By utilizing such an elongated cylindrical casing as the generating electrode a current flow is realized which is essentially radially outward at regions near the center thereof. A second pick-up electrode is positioned between the cylindrical casing and the adjacent walls of the bore hole, and the potential differences between both the pick-up electrode and ground and the casing and ground are recorded at the surface to provide an indication of the current flow at the region of the pick-up electrode. The entire assembly is raised or lowered in the bore hole to determine the resistivity of the various formations intercepted.

In accordance with a second embodiment of this invention there is provided an improved system of making resistivity measurements wherein the resistivity of the well fluids is effectively calculated and utilized as a correction factor to provide true measurements of the resistivity of the earth formations. To this end an improved electrode structure is employed which comprises an elongated cylindrical casing having a second electrode disposed in spaced relation therewith between the casing and the walls of the bore hole. This second electrode is positioned such as to lie along a line of constant potential emanating from the cylindrical casing. One or more third pick-up electrodes are positioned in spaced relation with each of the first two electrodes. A potential difference is applied between the cylindrical electrode and a point of reference ground potential and voltage measurements are made between both the second electrode and ground and between each of the third electrodes and ground. The total current emitted from the cylindrical electrode is measured, from which the resistivity of the drilling fluid can be calculated when the potential difference between the first and second electrodes and the geometric configuration are known.

Accordingly, it is an object of this invention to provide improved methods of exploring bore holes to determine properties of the adjacent earth formations.

Another object is to provide improved apparatus to be employed in making electrical resistivity measurements in bore holes.

A further object is to provide an improved electrode structure to be employed in well logging measurements.

Various other objects, advantages, and features of this invention should become apparent from the following detailed description taken in conjunction with the accompanying drawing in which.

Figure 1:
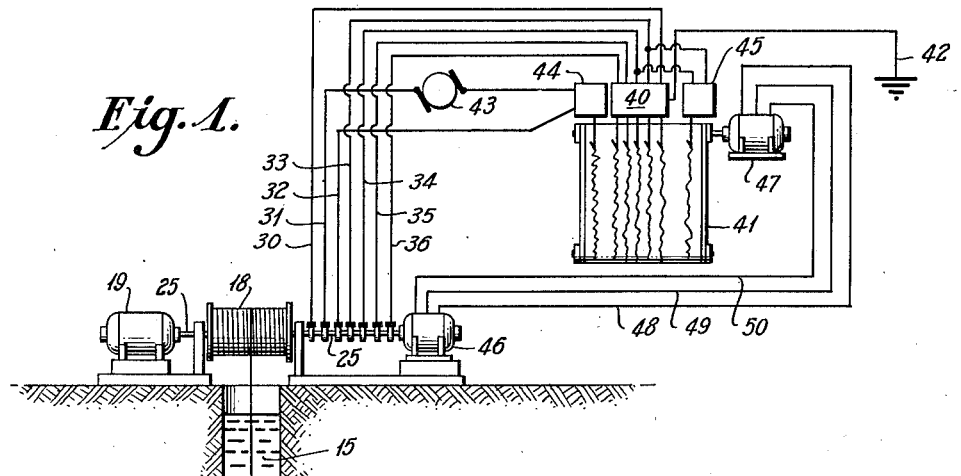
Figure 1 is a vertical sectional view through a bore hole illustrating one form of this invention in operative position.

Referring now to the drawing in detail and to Figure 1 in particular, there is shown a bore hole 10 which pierces various earth strata indicated generally at 11, 12, 13, and 14. Bore hole 10 is shown as being filled with a fluid 15 which normally comprises drilling mud. An armored cable 17 containing a plurality of electrical leads is suspended within bore hole 10 from a rotatable reel 18, the latter being rotated by the drive shaft 25 of a motor 19.

A first elongated metallic electrode 20 is attached to the lower end of cable 17 and serves as a point of reference ground potential, electrode 20 being in intimate contact with fluid 11. A second electrode assembly 22 is suspended in bore hole 10 below electrode 20 by means of a second armored cable 23 which is attached at its upper end to electrode 20. Cable 23 also contains a plurality of electrical leads which are connected with respective leads in cable 17, which in turn terminate in respective individual slip rings mounted on shaft 25. A plurality of electrical leads 30—36 are attached at one end to individual brushes which engage these respective slip rings on shaft 25. The second ends of leads 33—36 extend to a recording voltmeter 40 which provides traces on a chart 41 that are representative of the potential differences between the individual leads and ground, voltmeter 40 being provided with a grounded connection 42. Lead 31 is connected at its second end to a source of electrical energy 43, which can provide either direct or alternating current, the second terminal of which is connected to a recording galvanometer 44. Lead 32 is connected at its second end to the second terminal of galvanometer 44 which makes a trace on chart 41 representative of the current supplied by energy source 43. Leads 34 and 35 also are connected to a second voltmeter 45 which provides a trace on chart 41 representative of the potential difference between the two leads. A Selsyn transmitter 46 is connected to drive shaft 25 and a Selsyn receiver 47 is conected to the recorder chart 41. Leads 48, 49, and 50 connect transmitter 46 to receiver 47 such that chart 41 is moved in accordance with the depth at which the electrode assembly is suspended into the bore hole.

Figure 2:
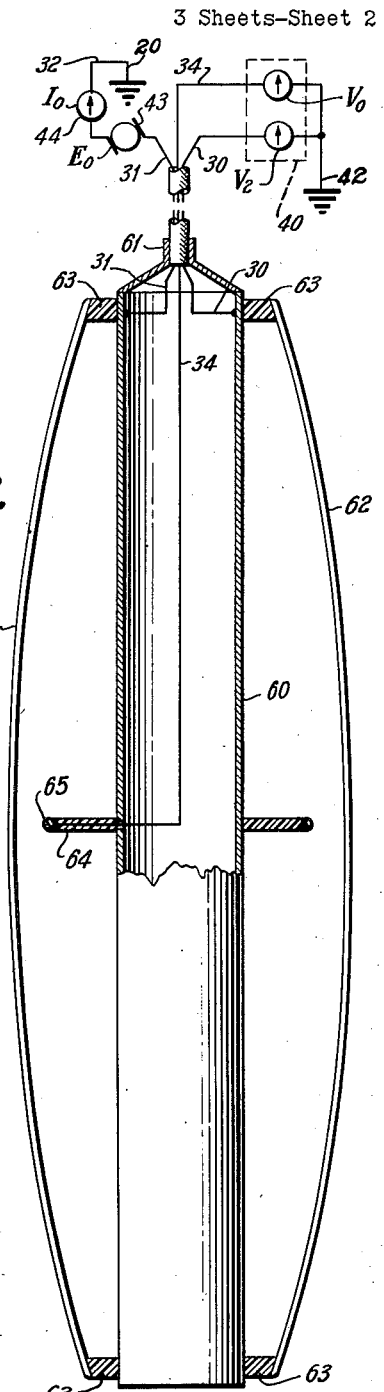
Figure 2 is an enlarged view partially in section of one form of electrode structure to be suspended in the bore hole.

In Figure 2 there is illustrated a first embodiment of electrode assembly 22 which comprises an elongated hollow cylindrical metallic casing 60 connected at its upper end to cable 23 by a suitable coupling 61. A plurality of flexible springs 62 are secured to casing 60 by insulating support rings 63 and extend outward therefrom to engage the walls of the bore hole thereby retaining casing 60 in substantially the center of the bore hole. A circular metallic ring 65 is positioned about casing 60 at approximately its midpoint longitudinally and is held in spaced relation therewith by a plurality of insulating support rods 64. One terminal of current source 43 is connected to metallic casing 60 by lead 31, and lead 32 extends to grounded electrode 20, which is represented schematically in Figure 2. Electrical lead 30 is connected at its lower end to casing 60 such that one of the traces provided on chart 41 represents the potential difference $V_0$ between casing 60 and ground. Electrical lead 34 is connected at its lower end to ring 65 such that a second trace on chart 41 represents the potential difference $V_2$ between ring 65 and ground. In the particular embodiment illustrated in Figure 2 the various remaining connecting leads shown in Figure 1 are omitted. These additional leads are utilized with the assemblies of Figures 3 and 4.

Figure 6:
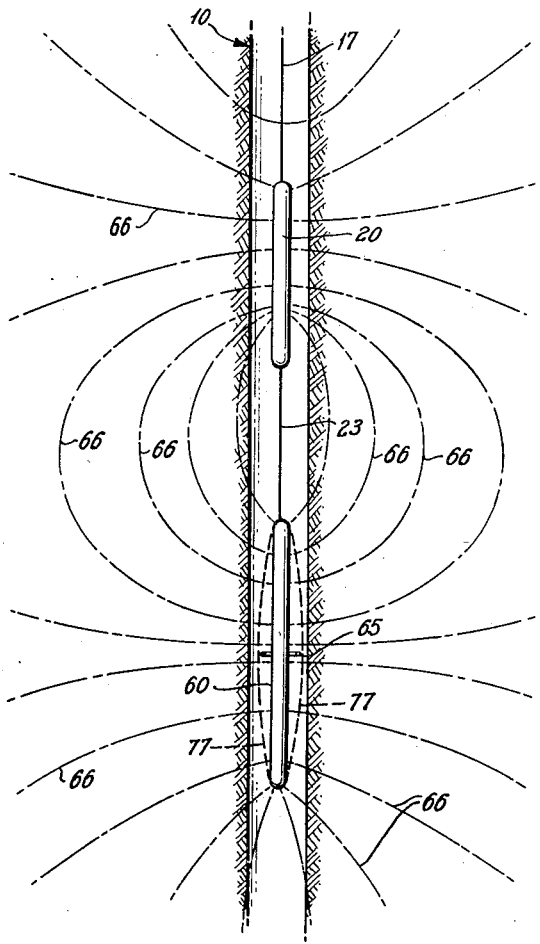
Figure 6 is a schematic representation of the current flow from the elongated cylindrical current electrode employed in this invention.

In Figure 6 there is illustrated in a schematic manner the current flow from casing 60. Lines 66 represent individual paths of such current flow. It can be seen that the lines 66 which emerge from approximately the midpoint of casing 60 lie in substantially a horizontal direction. Potentials along this particular current flow are measured in accordance with this invention to provide indications of the resistivity of the adjacent earth formation. In operation the entire assembly is either raised or lowered slowly through bore hole 10 to provide continuous measurements of the potential differences $V_0$ and $V_2$ and the current $I_0$ flowing through galvanometer 44. $I_0$ represents the total current flowing outward from casing 60. If the circuitry is operated such that $I_0$ remains constant the potential difference $V_2$ provides a direct indication of the changing resistivity of the formations adjacent ring 65. If $I_0$ does not remain constant the relative formation resistivities R adjacent ring 65 can be determined by simple computation from the measured voltages and currents by the application of Ohm's law, $$R = \frac{V_2}{I_0}$$

Figure 3:
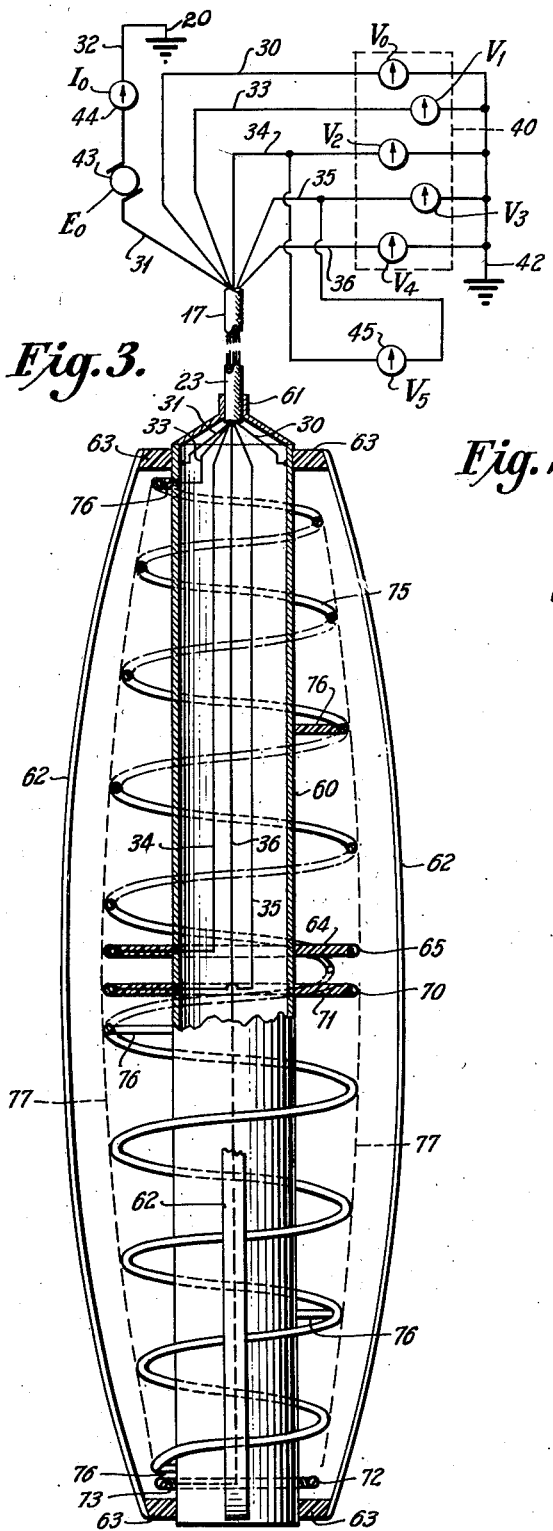
Figure 3 illustrates a second embodiment of electrode structure to be suspended in the bore hole.

A second form of the electrode assembly 22 is illustrated in Figure 3 wherein corresponding parts previously described in conjunction with Figure 2 are designated by like reference numerals. A second circular metallic ring 70 circles casing 60 adjacent ring 65 and is held in place by a plurality of insulating supports 71. Electrical lead 35 is connected at its lower end to ring 70 to provide a trace on chart 41 representative of the potential difference $V_3$ between ring 70 and ground. A third circular metallic ring 72 circles casing 60 at a region near the lower end thereof and is held in position by insulating supports 73. Electrical lead 36 is connected at its lower end to ring 72 to provide an additional trace on chart 41 representative of the potential difference $V_4$ between electrode 72 and ground. In addition to ring electrodes 65, 70, and 72, an elongated electrode 75 is spiraled about substantially the entire length of casing 60 and is held in spaced relation therewith by a plurality of insulating supports 76. The outside contour of spiral electrode 75 is represented by a shell 77 which also is shown in Figure 6 as being positioned at right angles to the various lines 66 representing the outward current flow from casing 60. Shell 77 thus represents a contour of constant potential. The diameters of ring electrodes 65, 70, and 72 are such that these three electrodes lie along constant potential shell 77. In order to prevent contact between electrodes 65 and 70 with electrode 75 the center section of electrode 75 passes inside electrodes 65 and 70.

Figure 5:
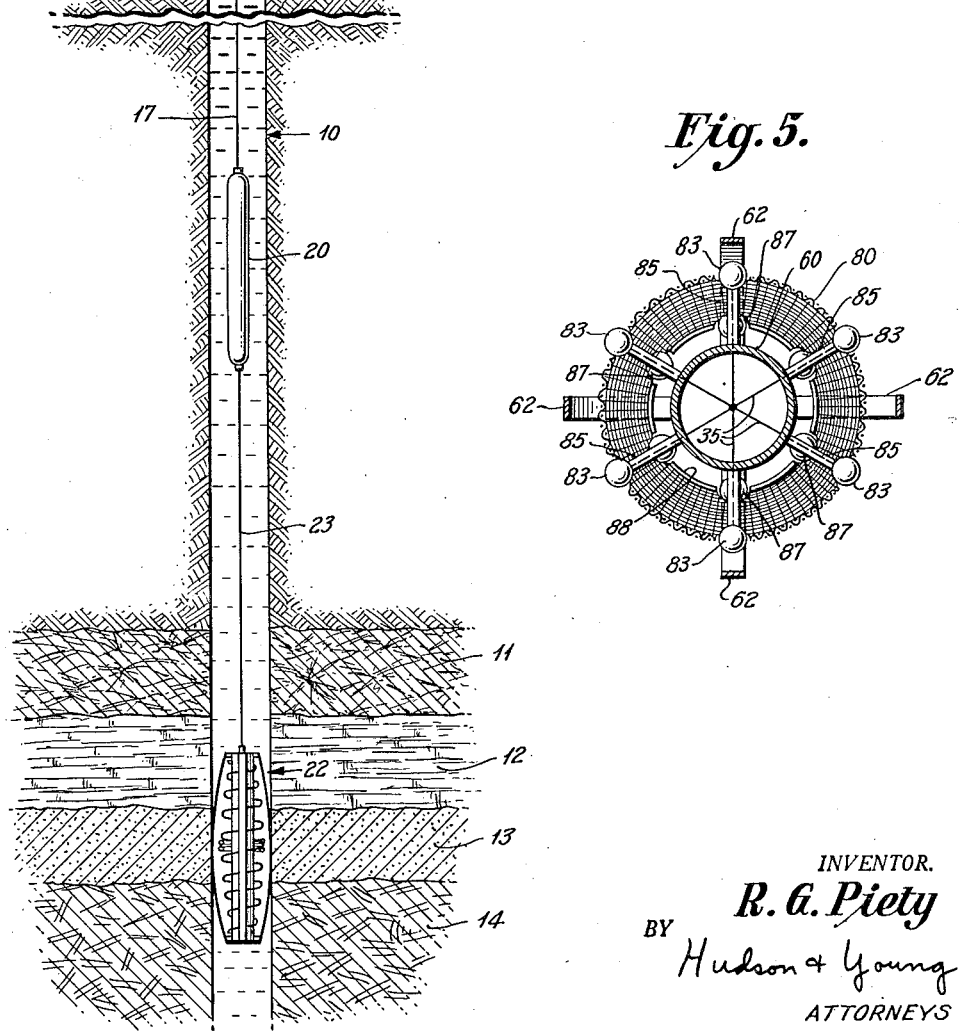
Figure 5 is a view taken along line 5—5 in Figure 4.
Figure 4:
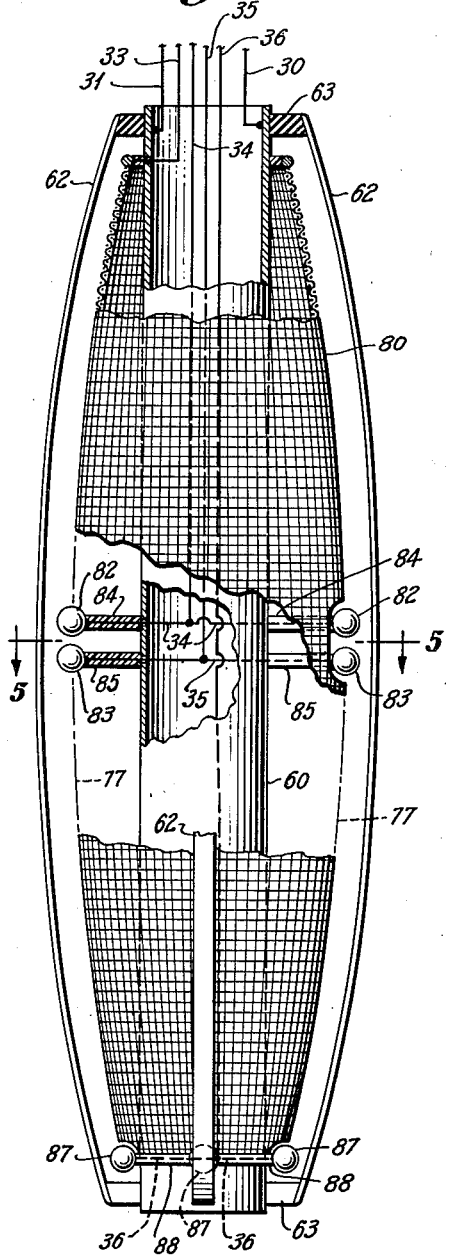
Figure 4 is a third embodiment of electrode structure to be suspended in the bore hole.

The electrode assembly illustrated in Figures 4 and 5 is a modified form of the assembly ilustrated in Figure 3. In this modified assembly spiral electrode 75 is replaced by a metallic mesh screen 80, the outside contour of which lies along constant potential shell 77. Ring electrodes 65 and 70 are replaced by a plurality of metallic spheres 82 and 83, respectively, which is held in position by suitable flexible insulating supports 84 and 85, respectively. Lower electrode 72 is replaced in like manner by a plurality of metallic spheres 87 mounted on insulating supports 88. Electrical leads 34, 35, and 36 are connected to each of the respective spheres 82, 83, and 87.

The operation of the electrode assemblies illustrated in Figures 3 and 4 should now become apparent. This operation will be explained in conjunction with Figure 3 although it is to be understood that the assembly of Figure 4 operates in the same manner. Spiral probe 75 in effect measures the drilling mud resistivity by virtue of the relation $V_0 - V_1 = R_1 I_{av}$ where $R_1$ is a resistance quantity equal to the product of the resistivity R of the drilling mud and a geometric factor involving the shape of the casing and electrode assembly. The ratio of the potential $V_1$ to the total current $I_0$ is a resistance which can be thought of as the resistance between the equipotential surface of spiral electrode 75 and a very large electrode 20 grounded at a very great distance. In actual practice this distance can be of the order of thirty feet or more. Probe electrodes 65, 70, and 72 assume potentials whereby $V_0 - V_{1,2,3,4} = K J_{1,2,3,4}$ the subscripts being taken one at a time to give the four relations. J is the current density in the neighborhood of the spiral electrode and K is a geometric constant for the geometry of the particular electrode assembly. In a homogeneous medium the current from the main electrode 60 is substantially constant for each unit of area near the center portion of the electrode and this current flows horizontally outward for a considerable distance. Even in the case of horizontal discontinuities in the earth strata that is, resistance changes in a horizontal plane, the lines of flow remain substantially horizontal. This is true because casing 60 is elongated and has a very low resistance and also because the potential drop from the casing 60 to the formations being measured is small compared to $V_0$. However, changes in formation resistances cause the current leaving the casing 60 to vary, with more current flowing opposite the low resistivity beds.

The net result is that the differences in potential between individual electrodes 65, 70, and electrode 75 are used to measure the difference of horizontally stratified bed resistivities. Because the potential $V_0$ is substantially constant (this can be accomplished by a constant voltage transformer mounted in electrode 20), the current density is approximately proportional to the conductivity of the adjacent beds. It can thus be seen then that the ratio of the currents which are obtained from the previous equations give the ratio of the conductivities, that is, the reciprocal of the resistivities. In effect spiral electrode 75 which represents a region of constant potential is utilized as the reference generating electrode. It is desired that spiral electrode 75 be positioned as near the walls of the bore hole as is practical. Meter 45 provides a measurement of the difference in conductivities adjacent electrodes 65 and 70. This differential reading is useful in locating interfaces between formations of different resistivities. Electrode 72 is positioned near the bottom of casing 60 merely to evaluate the formations of the bottom of the bore hole. Obviously this lower electrode does not provide the accuracy realized by the center electrodes 65 and 70 which are positioned in the region of the horizontal current flow.

From the foregoing description it should be apparent that there is provided in accordance with this invention an improved electrode assembly for use in well logging which effects horizontal current flow in the region at which resistivity measurements are to be made. A modified embodiment of this assembly provides means to effectively eliminate the resistance of the well fluids in determining true formation resistivities. Electrode 20 and assembly 22 preferably are as long as can conveniently be handled with available derrick equipment. As a practical matter a length of approximately 10 feet gives satisfactory results. The diameter of casing 60 preferably is approximately half the diameter of the bore hole or approximately four inches in diameter for most applications. Casing 60 preferably is cylindrical in shape to effect symmetrical current flow outward therefrom.

While this invention has been described in conjunction with present preferred embodiments thereof it is obvious that the invention is not limited thereto.

What is claimed is:

1. Apparatus for electrically logging a bore hole containing well fluids comprising an elongated generally cylindrical electrode; means for suspending said cylindrical electrode within a bore hole so that the axis of said cylindrical electrode is parallel to and coincident with the axis of the bore hole; means to apply a voltage between said cylindrical electrode and a point of reference potential remote from said cylindrical electrode; means to measure current flow between said cylindrical electrode and said point of reference potential; means to measure the potential difference between said cylindrical electrode and said point of reference potential; a second elongated electrode surrounding the side of said cylindrical electrode and spaced therefrom, the contour of said second electrode defining, generally, a truncated ellipsoid, the major axis of which is coaxial with the axis of said cylindrical electrode; means to measure the potential difference between said second electrode and said point of reference potential; a third electrode electrically insulated from said second electrode and positioned on the contour of said second electrode; and means to measure the potential difference between said second electrode and said point of reference potential.

2. The combination in accordance with claim 1 further comprising a fourth electrode electrically insulated from said second electrode and positioned on the contour of said second electrode in spaced relationship with said third electrode, and means to measure the potential difference between said fourth electrode and said point of reference potential.

3. The combination in accordance with claim 2 wherein the spacing between said third and fourth electrodes is small compared with the length of said cylindrical electrode and wherein said pair of third and fourth electrodes are spaced from said cylindrical electrode at approximately the midpoint thereof longitudinally, and further comprising means to measure the potential difference between said third and fourth electrodes.

4. The combination in accordance with claim 3 further comprising a fifth electrode surrounding said cylindrical electrode adjacent the lower end of said cylindrical electrode, when said cylindrical electrode is positioned within a bore hole, and means to measure the potential difference between said fifth electrode and said point of reference potential.

5. Apparatus for electrically logging a bore hole containing well fluids comprising an elongated generally cylindrical electrode, means for suspending said cylindrical electrode within a bore hole so that the axis of said cylindrical electrode is parallel to and coincident with the axis of the bore hole, means for applying a voltage between said cylindrical electrode and a point of reference potential remote from said cylindrical electrode, means for measuring current flow between said cylindrical electrode and said point of reference potential, means for measuring the potential difference between said cylindrical electrode and said point of reference potential, a second electrode spaced externally from said cylindrical electrode at approximately the midpoint thereof longitudinally, and means to measure the potential difference between said second electrode and ground.

6. Apparatus for electrically logging a bore hole containing well fluids comprising an elongated generally cylindrical electrode; a cable for suspending said cylindrical electrode within a bore hole; a flexible guide means secured to said cylindrical electrode to align said cylindrical electrode axially within the bore hole; a second electrode mounted on said cable in axial spaced relationship with said cylindrical electrode at a point a substantial distance from said cylindrical electrode to provide a reference ground potential at electrical infinity from said cylindrical electrode; means to apply a voltage between said cylindrical electrode and said second electrode; means to measure current flow between said cylindrical electrode and said second electrode; means to measure the potential difference between said cylindrical electrode and said second electrode; a third elongated electrode surrounding the side of said cylindrical electrode and spaced therefrom, the contour of said third electrode defining, generally, a truncated ellipsoid, the major axis of which is coaxial with the axis of said cylindrical electrode; means to measure the potential difference between said third electrode and ground; a fourth electrode electrically insulated from said third electrode and positioned on the contour of said third electrode; and means to measure the potential difference between said fourth electrode and ground.

7. An electrode assembly adapted to be lowered into a bore hole to make resistivity measurements comprising an elongated generally cylindrical electrode; a second elongated electrode surrounding the side of said cylindrical electrode and spaced therefrom, the contour of said second electrode defining, generally, a truncated ellipsoid, the major axis of which is coaxial with the axis of said cylindrical electrode; and a third electrode positioned in spaced relationship with said cylindrical electrode and with said second electrode so that said third electrode is positioned between said cylindrical electrode and the adjacent walls of the bore hole when said assembly is suspended in a bore hole so that the axis of said cylindrical electrode is parallel to and coincident with the axis of the bore hole, said third electrode being positioned on the contour of said second electrode between the ends of said cylindrical electrode.

8. The combination in accordance with claim 7 wherein said second electrode comprises a strip of electrically conductive material spiraled about substantially the entire length of said cylindrical electrode.

9. The combination in accordance with claim 7 wherein said second electrode comprises a metallic screen enclosing substantially the entire length of said cylindrical electrode.

10. The combination in accordance with claim 7 wherein said third electrode comprises a ring of electrically conductive material enclosing said cylindrical electrode.

11. The combination in accordance with claim 7 wherein said third electrode comprises a plurality of spheres of electrically conductive material disposed in a circular path about said cylindrical electrode, the plane of said circular path being substantially perpendicular to the axis of said cylindrical electrode, flexible insulating supports mounting said spheres in said path, and means electrically connecting each of said spheres with one another to form said third electrode.

12. An electrode assembly adapted to be lowered into a bore hole to make resistivity measurements comprising an elongated cylindrical electrode, flexible guide means attached to said cylindrical electrode to align said cylindrical electrode axially within the bore hole, a strip of electrically conductive material, a plurality of insulating supports mounting said strip of electrically conductive material so that said strip spirals about substantially the entire length of said electrical electrode, the contour of said strip defining, generally, a truncated ellipsoid, the major axis of which is coaxial with the axis of said cylindrical electrode, a ring of electrically conductive material, and means mounting said ring of electrically conductive material in spaced relationship with said strip so that said ring surrounds said cylindrical electrode at substantially the mid point thereof longitudinally, the plane of said ring being substantially perpendicular to the axis of said cylindrical electrode.

13. Apparatus for electrically logging a bore hole containing well fluids comprising an elongated generally cylindrical electrode, a cable for suspending said cylindrical electrode within a bore hole, flexible guide means secured to said cylindrical electrode to align said cylindrical electrode axially within the bore hole, a ring of electrically conductive material enclosing said cylindrical electrode in spaced relation therewith at approximately the midpoint thereof longitudinally, means applying a voltage between said cylindrical electrode and a point of ground potential remote from said cylindrical electrode, and means to measure the potential difference between said second electrode and ground.

14. A method of electrically logging a bore hole containing well fluids which comprises suspending a first elongated electrode in the bore hole to be logged, positioning a second grounded electrode at a region remote from said first electrode, applying a voltage between said first and second electrodes whereby current flows through the well fluids surrounding said first electrode and the earth formations adjacent thereto, measuring the total current flow between said first and second electrodes, suspending a third elongated electrode in the bore hole between said first electrode and the walls of the bore hole adjacent substantially the entire length of said first electrode, measuring the potential difference between said third electrode and ground in order to calculate the average resistivity of the well fluids surrounding said first electrode, suspending a fourth electrode in the region between said first electrode and the walls of the bore hole adjacent thereto, said fourth electrode being spaced vertically from said third electrode, and measuring the potential difference between said fourth electrode and ground whereby the resistivity of the earth formation adjacent said fourth electrode can be calculated, correction being made for the calculated resistivity of the well fluids.

15. A method in accordance with claim 14 further comprising simultaneously moving at least said first, third, and fourth electrodes through the bore hole while said current and potential difference measurements are being made.

16. A method in accordance with claim 14 further comprising suspending a fifth electrode in the region between said first electrode and the walls of the bore hole adjacent thereto, said fifth electrode being spaced vertically from said fourth electrode, and measuring the potential difference between said fourth and fifth electrodes to determine the difference in resistivity between the earth formations adjacent said fourth and fifth electrodes.

17. A method in accordance with claim 16 further comprising simultaneously moving at least said first, third, fourth, and fifth electrodes through the bore hole while said current and potential measurements are being made.

18. A method of electrically logging a bore hole containing well fluids which comprises suspending a first elongated electrode in the bore hole to be logged, grounding a second electrode at a region remote from said first electrode, applying a voltage between said first and second electrodes whereby current flows through the well fluids surrounding said first electrode and the earth formations adjacent thereto, measuring the total current flow between said first and second electrodes, suspending a third electrode in the bore hole between said first electrode and the walls of the bore hole adjacent said first electrode at approximately the midpoint thereof longitudinally, and measuring the potential difference between said third electrode and ground.

19. A method in accordance with claim 18 further comprising simultaneously moving at least said first and third electrodes longitudinally through the bore hole while said current and voltage measurements are being made.

References Cited in the file of this patent
UNITED STATES PATENTS

| | | |
|---|---|---|
| 2,202,656 | Haynes | May 28, 1940 |
| 2,266,071 | Piety | Dec. 16, 1941 |
| 2,281,766 | Hawley | May 5, 1942 |
| 2,371,270 | Smith | Mar. 13, 1945 |
| 2,388,896 | Aiken | Nov. 13, 1945 |
| 2,404,622 | Doan | July 23, 1946 |
| 2,414,194 | Ennis | Jan. 14, 1947 |
| 2,707,768 | Owen | May 3, 1955 |